United States Patent
Inose et al.

(10) Patent No.: US 10,308,113 B2
(45) Date of Patent: Jun. 4, 2019

(54) DIFFERENTIAL GEAR

(71) Applicant: GKN Driveline Japan Ltd., Tochigi (JP)

(72) Inventors: Hideyuki Inose, Tochigi (JP); Yasuo Yamanaka, Tochigi (JP); Yasushi Nagamori, Tochigi (JP)

(73) Assignee: GKN Driveline Japan Ltd, Tochigi, Tochigi (JP)

( * ) Notice: Subject to any disclaimer, the term of this patent is extended or adjusted under 35 U.S.C. 154(b) by 99 days.

(21) Appl. No.: 15/641,530

(22) Filed: Jul. 5, 2017

(65) Prior Publication Data

US 2017/0297428 A1 Oct. 19, 2017

Related U.S. Application Data

(63) Continuation of application No. PCT/JP2015/055040, filed on Feb. 23, 2015.

(51) Int. Cl.
*B60K 23/04* (2006.01)
*F16D 27/112* (2006.01)
(Continued)

(52) U.S. Cl.
CPC ............ *B60K 23/04* (2013.01); *B60K 17/165* (2013.01); *B60K 23/08* (2013.01); *F16D 27/108* (2013.01);
(Continued)

(58) Field of Classification Search
CPC ....... B60K 17/165; B60K 23/04; F16H 48/08; F16H 48/24; F16H 48/34
See application file for complete search history.

(56) References Cited

U.S. PATENT DOCUMENTS 3,390,593 A * 7/1968 Brownyer ............... F16H 48/08
180/24.09
3,958,464 A * 5/1976 Kronbergs ............... F16H 48/12
74/650
(Continued)

FOREIGN PATENT DOCUMENTS

JP H05-44795 A 2/1993
JP 2001-018678 A 1/2001
(Continued)

OTHER PUBLICATIONS

International Search Report and Written Opinion for PCT/JP2015/055040 dated May 26, 2015 (12 pages; with English translation).
(Continued)

*Primary Examiner* — Edwin A Young
(74) *Attorney, Agent, or Firm* — Bejin Bienerman PLC (57) ABSTRACT

A differential device is provided with an outer case receiving torque; a differential gear set so geared as to allow differential motion between first and second axles; a clutch including an inner case supporting the differential gear set, and a clutch ring drivingly engaged with the outer case to transmit the torque from the outer case and axially movable to disconnectably connect with the inner case, the clutch ring having an end section led out of the outer case; a first spring creating a repulsive force in a disconnecting direction; a second spring creating a repulsive force in a connecting direction; and an actuator including a plunger so disposed as to exert a thrust force axially on the end section of the clutch ring, and a solenoid driving the plunger in a direction to make the clutch ring disconnect from or connect with the inner case.

9 Claims, 5 Drawing Sheets

(51) Int. Cl.
  *F16D 27/118* (2006.01)
  *F16H 48/08* (2006.01)
  *F16H 48/24* (2006.01)
  *F16H 48/34* (2012.01)
  *F16D 27/108* (2006.01)
  *B60K 17/16* (2006.01)
  *B60K 23/08* (2006.01)

(52) U.S. Cl.
  CPC .......... *F16D 27/112* (2013.01); *F16D 27/118* (2013.01); *F16H 48/08* (2013.01); *F16H 48/24* (2013.01); *F16H 48/34* (2013.01); *B60K 2023/0858* (2013.01); *B60Y 2400/421* (2013.01)

(56) References Cited

U.S. PATENT DOCUMENTS

| | | | | |
|---|---|---|---|---|
| 5,037,362 | A | * | 8/1991 | Teraoka .................. F16H 48/08 475/230 |
| 2002/0155913 | A1 | | 10/2002 | Fusegi et al. |
| 2003/0162622 | A1 | | 8/2003 | Fusegi et al. |
| 2003/0184171 | A1 | | 10/2003 | Teraoka et al. |
| 2005/0277510 | A1 | | 12/2005 | Fusegi et al. |
| 2009/0093334 | A1 | * | 4/2009 | Isaac-Lowry ........... F16H 48/08 475/235 |
| 2011/0105264 | A1 | | 5/2011 | Maruyama et al. |

FOREIGN PATENT DOCUMENTS

| | | | |
|---|---|---|---|
| JP | 2003-322240 | A | 11/2003 |
| JP | 2004-208460 | A | 7/2004 |
| JP | 2009-228840 | A | 10/2009 |
| JP | 2011099460 | | 5/2011 |
| JP | 2011122653 | | 6/2011 |
| JP | 2013-057293 | A | 3/2013 |

OTHER PUBLICATIONS

Chinese Official Action for Chinese Application No. 201580072727.3 dated Oct. 18, 2018 (14 pages; with English translation).
European Extended Search Report for European Application No. 15883124.8 dated Sep. 25, 2018 (9 pages).
Chinese Official Action for Chinese Application No. 201580072727.3 dated Oct. 18, 2018 (6 pages).

* cited by examiner

DIFFERENTIAL GEAR

CROSS-REFERENCE TO RELATED APPLICATIONS

This application is a continuation application of, and claims priority to, PCT International Application No. PCT/JP2015/055040 filed Feb. 23, 2015, the entirety of which is hereby incorporated by reference.

BACKGROUND

As is well known, a vehicle is comprised of one or more differential gears and each of them is used for transmitting torque provided to a differential case to a pair of output shafts while allowing differential motion therebetween.

Some differential gears have means for limiting or locking differential motion under proper control, thereby preventing wheels from losing traction even when any of the wheels loses contact with the ground. They are often referred to as "lock-up differentials." In the other differential gears in contrast, these differential gear sets are rotatable freely from these differential cases and the differential gears are comprised of means for controllably transmitting torque from the differential cases to the differential gear sets. The latter are often referred to as "free-running differentials" and are used for realizing so-called "part-time 4WD" configuration or such purposes.

Any of the aforementioned respective means can be realized by a combination of a clutch combined with a differential gear and an actuator for connecting and disconnecting the clutch for example.

While a solenoid can exert a force in either direction, there may be a case where the solenoid is so structured as to exert a force generally in a single direction and a return spring is used in combination therewith for the purpose of simplifying its action. The following documents disclose related subject matter.

Japanese Patent Application Laid-open No. 2011-099460
Japanese Patent Application Laid-open No. 2011-122653

SUMMARY

The present disclosure includes a differential gear comprising a clutch that uses a solenoid for connecting and disconnecting thereof, and more particularly a differential that uses two or more springs in combination with the solenoid.

As will be understood from the above descriptions, it is enough to use only one spring in order to realize actions as the lock-up differential or the free-running differential. The present inventors have, however, studied further and accordingly found that such configuration would leave some room to be improved.

If a spring is used in a direction to put the clutch into a connected state for example, the spring needs repulsive force strong enough to keep a connection even if the torque acts thereon. If a solenoid is used to exert thrust force in a direction opposite thereto, the solenoid needs still stronger thrust force against this strong repulsive force. More specifically, a very strong solenoid is required and further required is a sufficiently large amount of electric power for operating such a strong solenoid.

The present inventors have studied a structure of a novel actuator in light of the aforementioned problems.

According to an aspect, a differential device is comprised of an outer case receiving torque and rotatable about an axis; a differential gear set housed in the outer case and combinable with first and second axles, the differential gear set being so geared as to allow differential motion between the first and the second axles; a clutch including an inner case supporting the differential gear set, and a clutch ring drivingly engaged with the outer case to transmit the torque from the outer case and axially movable to disconnectably connect with the inner case, the clutch ring having an end section led out of the outer case; a first spring creating a repulsive force in a direction to make the clutch ring disconnect from the inner case; a second spring creating a repulsive force in a direction to make the clutch ring connect with the inner case; and an actuator including a plunger so disposed as to exert a thrust force axially on the end section of the clutch ring, and a solenoid, in response to input of an electric power, driving the plunger in a direction to make the clutch ring disconnect from or connect with the inner case.

DESCRIPTION OF EMBODIMENTS

Exemplary embodiments will be described hereinafter with reference to FIGS. 1 through 7.

Throughout the following description and the appended claims, an axial direction is defined as a direction along a rotation axis of a differential device unless described otherwise. Further, while the right and the left are discriminated for the convenience of explanation, the following embodiments would be embodied even if they were reversed. Still further, while expressions such as "to receive torque" and "to output torque" are often used, they are merely for the purpose of illustration and the torque may be transmitted in a reverse direction against the direction in the description.

While the following description generally relates to a free-running differential, the same or similar structure can apply to a lock-up differential.

Figure 1:
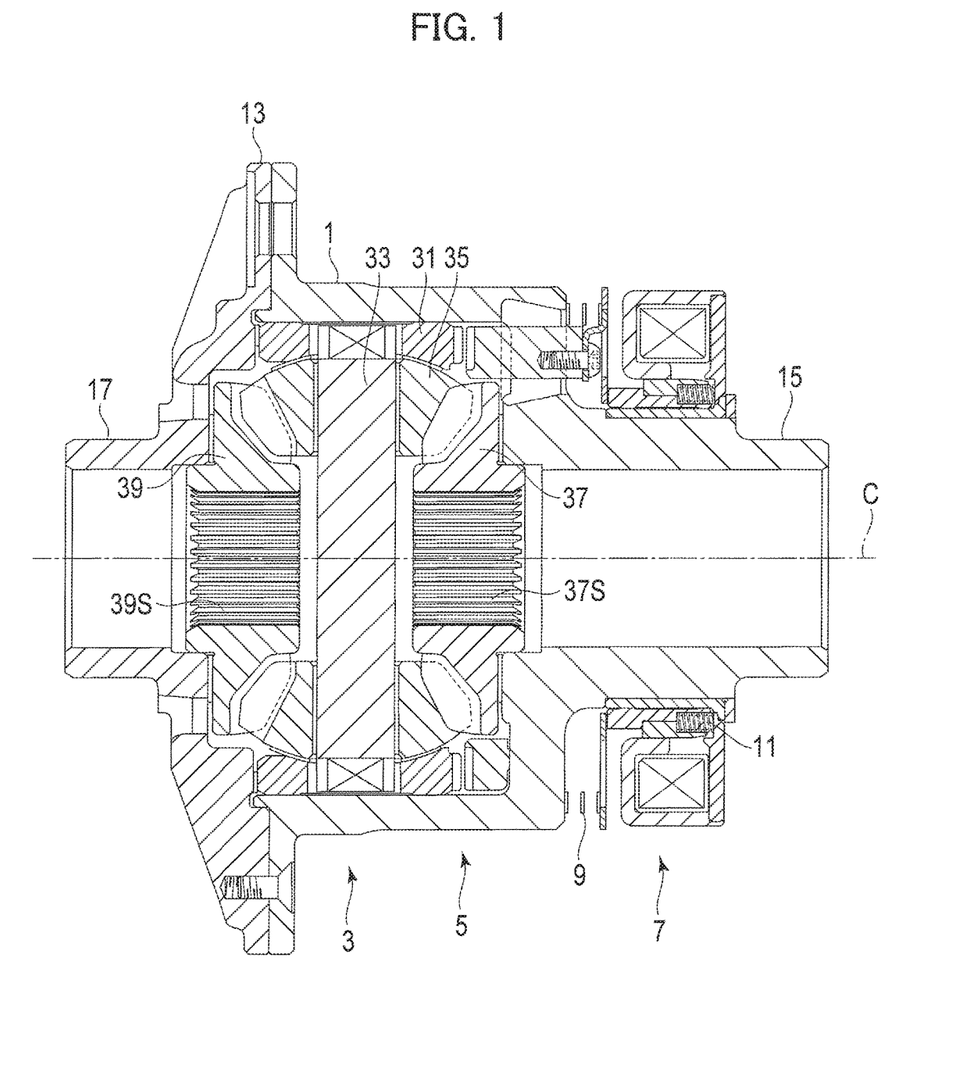
FIG. 1 is a cross sectional view of a differential gear device in accordance with an embodiment.

Referring to FIG. 1, in accordance with an embodiment, a differential device is generally comprised of an outer case 1 that receives torque from an engine or an electric motor to rotate about an axis C, a differential gear set 3 that differentially distributes the torque to right and left axles, a clutch 5 that disconnectably connects the outer case 1 with the differential gear set 3, an actuator for driving the clutch 5, a first spring 9 biasing the clutch 5 in a direction to disconnect the clutch 5, and a second spring 11 biasing the clutch 5 in a direction to connect the clutch 5. In contrast to the prior art, two springs 9, 11 exerting forces in opposite directions to each other are used.

The differential gear set 3 is supported by an inner case 31, and the inner case 31 is rotatable independently from the outer case 1. When the clutch 5 is connected, torque is transmitted from the outer case 1 via the inner case 31 to the differential gear set 3 and then the differential gear set 3 differentially distributes this torque to the right and left axles. When the clutch 5 is disconnected, the torque is not transmitted so that both the axles can freely rotate. This differential device can be used for realizing a part-time 4WD (4-wheel drive) configuration, for example. Of course this embodiment can be further used for other purposes.

The outer case has a shape symmetric about the axis C, which is in general cylindrical, and is so structured as to house the differential gear set 3 and the other elements therein. The outer case 1 may be dividable into two or more for the convenience of accommodation of the internal elements and, in the example shown in the drawing, a cover body 13 is dividable at its flange section from its main body. The internal elements are introduced therein in a state where the cover body 13 is detached and thereafter the cover body 13 along with a ring gear not shown in the drawing is fixed to the main body by means of bolts or such. The ring gear is then fixed to the flange section and is used for receiving the torque.

The outer case 1 is comprised of boss portions 15, 17 projecting in directions along the axis C and is rotatably supported by a carrier via the boss portions 15, 17, thereby being rotatable about the axis C. One boss portion 15 is longer than the other boss portion 17 and the actuator 7 can be fit thereon.

Any type of a gear set so meshed as to allow differential motion is applicable to the differential gear set 3. The example illustrated in the drawings is a bevel gear type, which is comprised of a plurality of pinion shafts 33 supported by the inner case 31, a plurality of pinion gears 35 respectively supported by and made rotatable about the pinon shafts 33, a right side gear 37 and a left side gear 39 respectively meshed with the pinion gear 35 to create differential motion relative to each other. The side gears 37, 39 generally have coupling structures such as splines 37S, 39S, thereby being coupled with the right and left axles respectively.

Figure 2A:
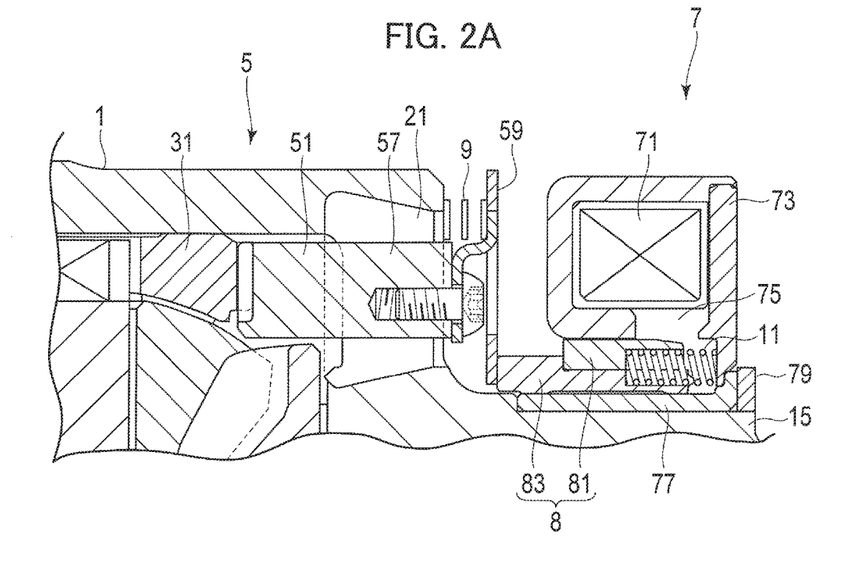
FIG. 2A is a cross sectional elevational view of the differential gear device, which shows an enlarged view of an actuator and a clutch thereof where the clutch is in a connected stated.
Figure 2B:
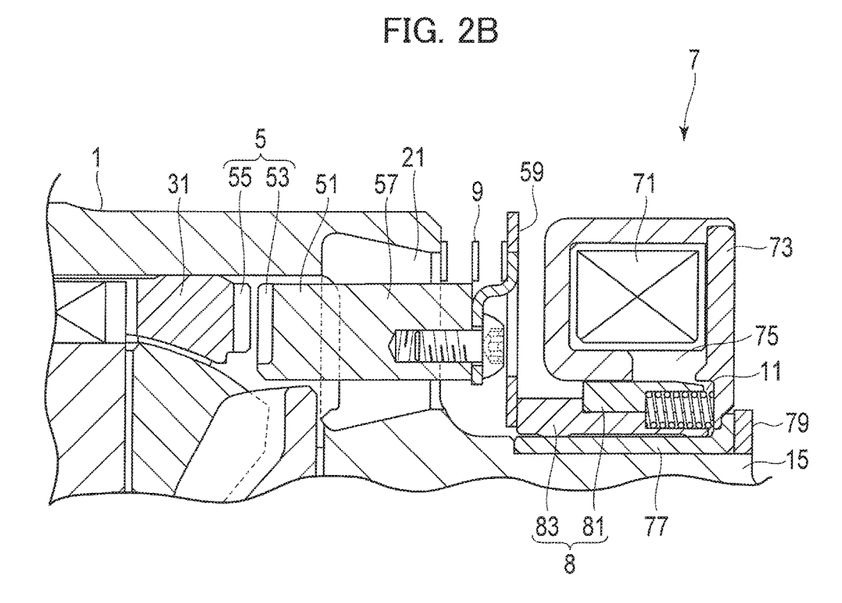
FIG. 2B is a cross sectional elevational view of the differential gear device, which shows an enlarged view of an actuator and a clutch thereof where the clutch is in a disconnected stated.

Referring to FIGS. 2A, 2B in combination with FIG. 1, to transmit torque from the outer case 1, the differential device is comprised of a clutch ring 51 coupled thereto. The clutch ring 51, formed in a ring-like shape in its general shape, is disposed within the outer case 1 so as to look to the inner case 31, is further disposed outside and coaxially with the side gear 37 for example, and is axially movable.

In the clutch ring 51, an end facing the inner case 31 is comprised of clutch teeth 53. The inner case 31, correspondingly on its end, is comprised of clutch teeth 55. The clutch teeth 53 and the clutch teeth 55 are so toothed as to mesh with each other, thereby constituting the clutch 5.

The clutch ring 51 is comprised of a plurality of protruding sections 57 that project in a direction opposite to the side facing the inner case 31. These protruding sections 57 are arranged in a circumferential direction and are preferably arranged to have rotational symmetry about the axis C. The outer case 1 is comprised of a plurality of through-holes 21 respectively corresponding to the protruding sections 57, through which the protruding sections 57 are led out of the outer case 1. As side walls of the protruding sections 57 abut on side walls of the through-holes 21, the clutch ring 51 receives torque from the outer case 1. To convert torque into axial force in part, the side walls of the protruding sections 57 and the side walls of the through-holes 21 may correspondingly slope in the circumferential direction. This may assist retention of connection of the clutch 5.

As shown in FIG. 2A, as the clutch 5 is connected (the clutch ring 51 is connected with the inner case 31), torque is transmitted to the differential gear set 3. In turn, as the shown in FIG. 2B, as the clutch 5 is disconnected (the clutch ring 51 is disconnected from the inner case 31), the differential gear set 3 is released from the outer case 1 and is then freely rotatable.

To the protruding sections 57, at ends thereof, and outside the outer case 1, a pressure plate 59 may be coupled to provide contact with a plunger 8 described below. The pressure plate 59 is formed in a disk shape at least partly continuously in a circumferential direction. The coupling of the protruding sections 57 with the pressure plate 59 may be made by screws, for example, so that, after housing the clutch ring 51 into the outer case 1, the pressure plate 59 can be coupled thereto, but not limited thereto.

The actuator 7 is comprised of a solenoid 71 generating a magnetic flux in response to electric power input, and the plunger 8 driven by the magnetic flux. The solenoid 71 may be formed into a shape surrounding the axis C and the plunger 8 adjoins an outer periphery, an inner periphery, or any other part thereof so as to be axially driven in response to the magnetic flux. The appended drawings show an example in which the solenoid 71 adjoins the inner periphery.

To efficiently conduct the magnetic flux, a core made of a material having magnetism may surround the solenoid 71. The core 73, at the side facing the plunger 8, may be comprised of a gap 75 and, in this case, the plunger 8 is so disposed as to span the gap 75. The magnetic flux does not leap over the gap 75 but flows to make a detour through the plunger 8, and thus this magnetic flux drives the plunger 8.

While the core 73 may be entirely made of a material having magnetism, alternatively only the part surrounding the solenoid 71 may have magnetism and the other part where the plunger 8 is contacted may be of a non-magnetic material. Further it may be comprised of a sleeve 77 elongated from the latter part and is preferably made of a non-magnetic material. As the sleeve 77 fits on the boss portion 15, the solenoid 71 and the core 73 are set coaxially in place relative to the axis C. To make these parts be of a non-magnetic material is advantageous for prevention of leakage of the magnetic flux. Coupling between the magnetic part and the non-magnetic part may be made by welding for example but alternatively may be made by any other means of brazing, screwing, press-fitting or such.

To prevent displacement of the actuator 7, a retainer 79 may be fitted on the boss portion 15 so as to abut the sleeve 77. Any means of press-fitting, brazing, welding or such may be applied to fixation of the retainer 79.

While the plunger 8 may be entirely made of a material having magnetism, alternatively only a part 81 facing the core 73 may have magnetism and another part 83 facing the boss portion 15 and the pressure plate 59 may be of a non-magnetic material. This improves usage efficiency of the magnetic flux and is beneficial to prevention of leakage of the magnetic flux. Coupling between the magnetic part 81 and the non-magnetic part 83 may be made by press-fitting for example but alternatively may be made by any other means of bonding, brazing, welding or such.

The plunger 8 (particularly its magnetic part 81) may be disposed to cover completely the gap 75 but alternatively may be disposed to cover the gap 75 partly. Before a state in which the magnetic flux is generated, as shown in FIG. 2A, the plunger 8 partly covers the gap 75 and, when the magnetic flux is generated and the plunger 8 moves to the end as shown in FIG. 2B, overlap between the plunger 8 and the gap 75 becomes greater. Or, the plunger 8 and the gap 75 may be so dimensioned that the plunger 8 in this state substantially covers the gap 75 completely. According to this structure, as shown in a curve M in FIG. 7, thrust force is relatively small as the overlap between the plunger 8 and the gap 75 is relatively small when the plunger 8 is in its initial position (the position shown in FIG. 2A), and in turn the thrust force could drastically grow greater as the plunger moves toward the end (the position shown in FIG. 2B) because the overlap grows greater.

As being understood from the descriptions so far, when the electric power is ON, the solenoid 71 drives the plunger 8 rightward in the respective drawings, more specifically toward a direction where the clutch ring 51 is disengaged from the inner case 31. Alternatively, the solenoid 71, when energized, may drive the plunger 8 rightward in the respective drawings, more specifically toward a direction where the clutch ring 51 is engaged with the inner case 31. Further, in the example shown in FIGS. 1 through 2B, the position of the gap 75 (somewhat righter in the drawings) causes the thrust force to grow greater as the plunger 8 moves toward the direction where the clutch 5 is disengaged. Alternatively, the gap 75 may be so disposed in a position (somewhat leftward in the drawings) as to cause the thrust force to grow greater as the plunger 8 moves toward the direction where the clutch 5 is engaged.

Referring again to FIGS. 1 through 2B, the first spring 9 is interposed between the pressure plate 59 and the outer case 1 for example in a compressed state so as to create a repulsive force, and thus biases the pressure plate 59 toward the direction where the clutch ring 51 is disengaged from the inner case 31.

The second spring 11 is interposed between the plunger 8 and the core 73 for example in a compressed state so as to create a repulsive force, and thus biases the plunger 8 toward the direction where the clutch ring 51 is engaged with the inner case 31. The plunger 8 may be comprised of a cylindrical hollow corresponding to the second spring 11, in which the second spring 11 may be loaded.

Figure 3:
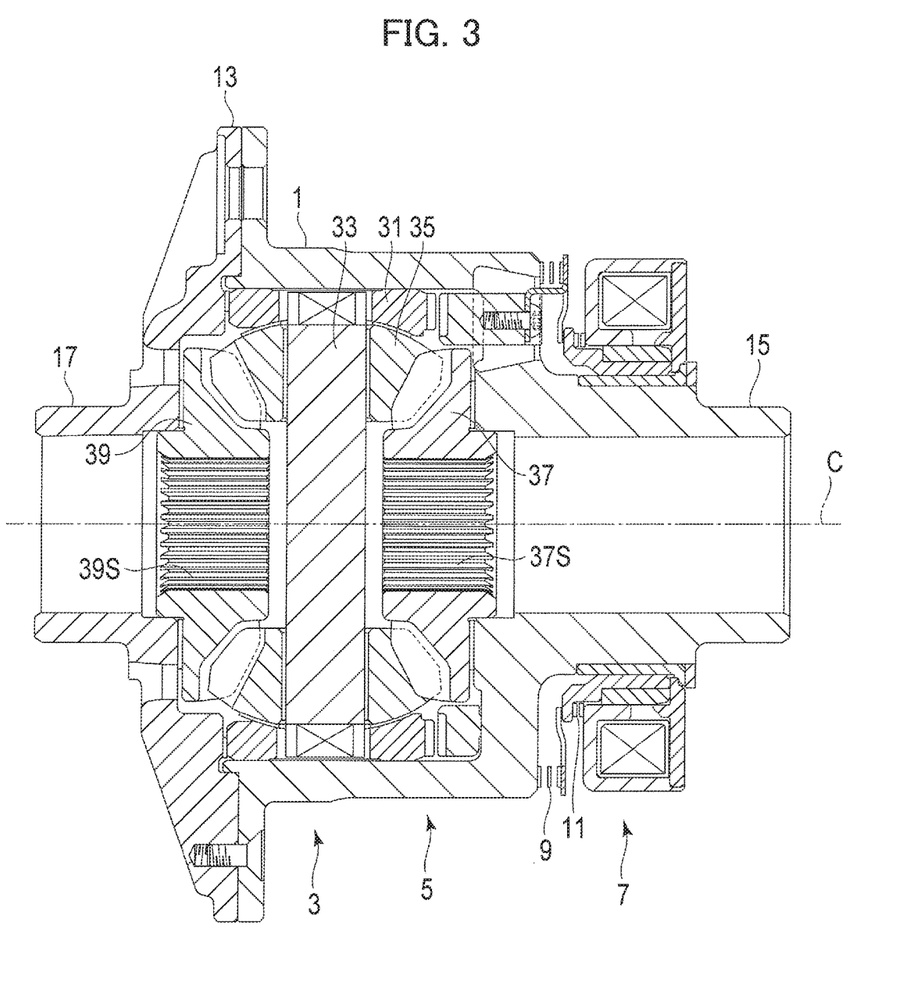
FIG. 3 is a cross sectional elevational view of the differential gear device in accordance with another embodiment.

The shape of the plunger 8 and the arrangement of the two springs 9, 11 can have various variations. As shown in FIG. 3, for example, a part of the plunger 8, for example an end in contact with the pressure plate 59, may project radially outward like as a flange, and the second spring 11 may be interposed between this projecting part and the core 73.

Yet further alternatively, although not shown in the drawings, such a flange-like part may be elongated beyond the pressure plate 59 toward the clutch 5, and further projected radially outward like as a flange to engage with a back face (a face looking to the clutch 5) of the pressure plate 59. In this case, the solenoid 71 by means of its thrust force draws the plunger 8. Further, the first spring 9 may be repulsively interposed between this flange-like part and the back face of the pressure plate 59. Further the second spring 11 may be so disposed within the outer case 1 as to bias a back face of the clutch ring 51.

Figure 7:
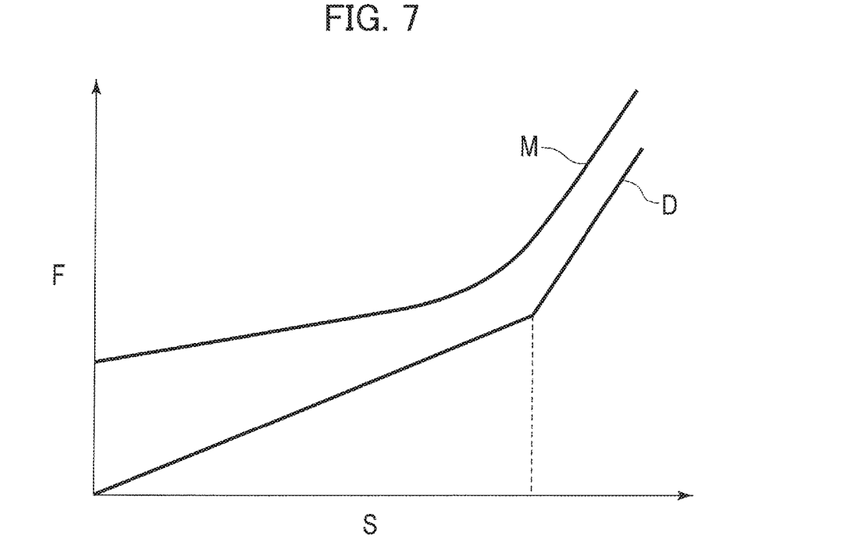
FIG. 7 is a graph schematically showing change in repulsive force and thrust force relative to stroke lengths.

As the two springs 9, 11 that exert repulsive forces in opposite directions are used in combination as in any of the above embodiments, a net repulsive force as shown in FIG. 7 acts on the clutch ring 51. In FIG. 7, the polygonal line D represents repulsive force F as a function of stroke length S. In a range where both the springs do not reach expansion or compression limits (left of the broken line in the drawing), because repulsive forces by these springs cancel each other, the slope of the polygonal line D stays relatively gentle. After one of the springs reaches the expansion or compression limit (in the right of the broken line in the drawing), only the other spring exerts the repulsive force on the clutch ring 51 and thus the slope of the polygonal line D prominently grows steeper.

As will be readily understood, the shape of the polygonal line D can be properly regulated by the lengths of the expansion or compression limits of the springs 9, 11. More specifically, the slope before both the springs do not reach the expansion or compression limits depends on a difference of spring moduli of the springs 9, 11 and the slope after one of the springs reaches the limit depends on the spring modulus of the other spring. The point of flexure of the polygonal line D depends on the relation between the lengths of the expansion or compression limits of the springs.

Further, to properly select a configuration about the two springs 9, 11 and the actuator 7 allows modification of response by the clutch 5 to electric power input. The example shown in FIG. 7 corresponds to a configuration in which the spring modulus of the second spring 11 is greater and the clutch 5 steadily is connected. In this configuration, the actuator 7 is so structured that the solenoid 71 makes the clutch 5 disengaged when the electric power is turned on (Power ON—Clutch free). Alternatively, if the spring modulus of the first spring 9 is made greater, the clutch 5 steadily is disconnected. In this configuration, the actuator 7 is so structured that the solenoid 71 makes the clutch 5 engaged when the electric power is turned on (Power OFF—Clutch free).

In either case, just after the electric power is turned on, the actuator 7 exerts only relatively small thrust force and its increase is also relatively small, however, as increase in the drag force by the two springs 9, is also relatively small, the thrust force by the actuator 7 can steadily overcome the drag force. Around the end of driving, the thrust force by the actuator 7 rapidly increases. Then even if the drag force by the springs 9, 11 rapidly increases, the thrust force by the actuator 7 can still overcome the drag force. It is not required to use an excessively powerful solenoid or input great amount of electric power in order to counter the drag force by the springs. Further, the net thrust force calculated by subtracting the drag force by the springs 9, 11 from the original thrust force by the actuator 7 (the difference between the curve M and the polygonal line D in FIG. 7) becomes substantially constant independent of the stroke. These factors contribute to saving electric power, thrust force stabilization, and preventing the plunger from being subject to excessive impact.

Any structure to limit the movable range of the plunge 8 can be applied to the device. Around the end of driving by the actuator 7 as shown in FIG. 2B, for example, the plunger 8 and the core 73 can be so dimensioned that the plunger 8 abuts on the core 73. Such a structure can utilize a range around which the thrust force by the actuator 7 becomes maximum, and therefore the electric power is efficiently used. Further, as the plunger 8 is put exactly in place only by the actuator 7, any other elements for regulating the position of the plunger 8, such as the clutch ring 51 and the pressure plate 59, are not necessary to be precisely positioned. Machining and assembly become prominently easy.

The plunger 8 may be so dimensioned that a head of the plunger 8 is slightly detached from the pressure plate 59 when the plunger 8 reaches the end position. As the plunger 8 belongs to the stationary system although the pressure plate 59 belongs to the rotating system, contact therebetween causes mutual friction and therefore results in energy loss. If the head of the plunger 8 is slightly detached from the pressure plate 59, this energy loss can be prevented.

The movable range in the opposite direction (the direction to have the clutch 5 engaged) is inherently limited. For example, if the electric power is not applied to the solenoid 71, the plunger 8 will halt at a point where the repulsive forces of the springs 9, 11 just balance out.

Figure 4:
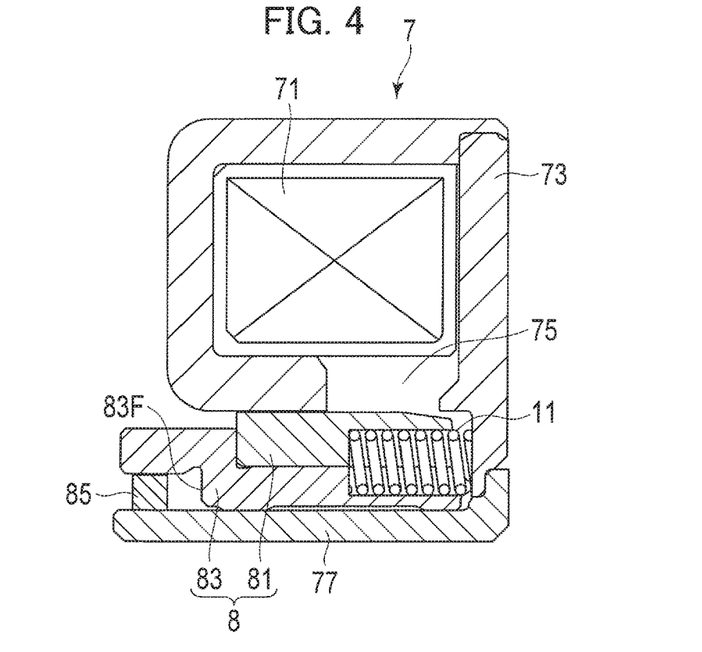
FIG. 4 is a cross sectional elevational view of a solenoid in accordance with a modified example.
Figure 5:
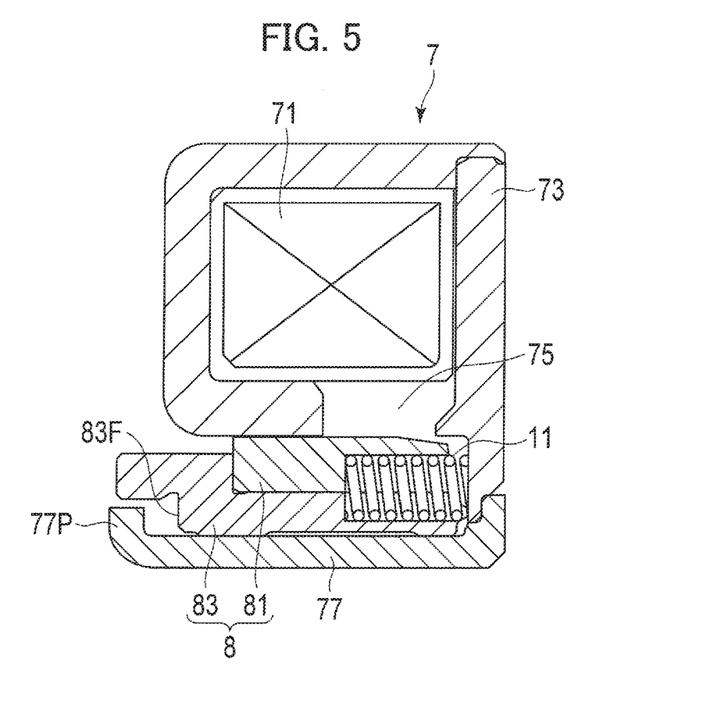
FIG. 5 is a cross sectional elevational view of a solenoid in accordance with another modified example.

Of course, any structure which actively limits the movable range can be applied. For example, as shown in FIG. 4, a contact face 83F may be formed on the plunger 8, particularly on the non-magnetic part 83 thereof, and a stopper 85 may be provided so as to abut thereon. The stopper 85 may be fixed to the sleeve 77 for example. Alternatively as shown in FIG. 5, the sleeve 77 may be bent radially outward to form a part 77P and then the contact face 83F can be made to abut thereon so as to limit the movable range of the plunger 8.

By limiting the movable range as described above, tops of the clutch teeth 53 may be prevented from striking roots of the clutch teeth 55 (or tops of the clutch teeth 55 from roots of the clutch teeth 53). If the torque acts on the clutch in a state where the tooth tops strike the tooth roots, unexpectedly great stress concentration might occur around the tooth tops, which can cause shortening of a lifetime of the clutch teeth 53, 55. If the tooth tops are prevented from the tooth roots by limiting the movable range, the lifetime of the clutch teeth 53, 55 can be elongated and/or the durability in severe environments of usage can be improved.

Figure 6:
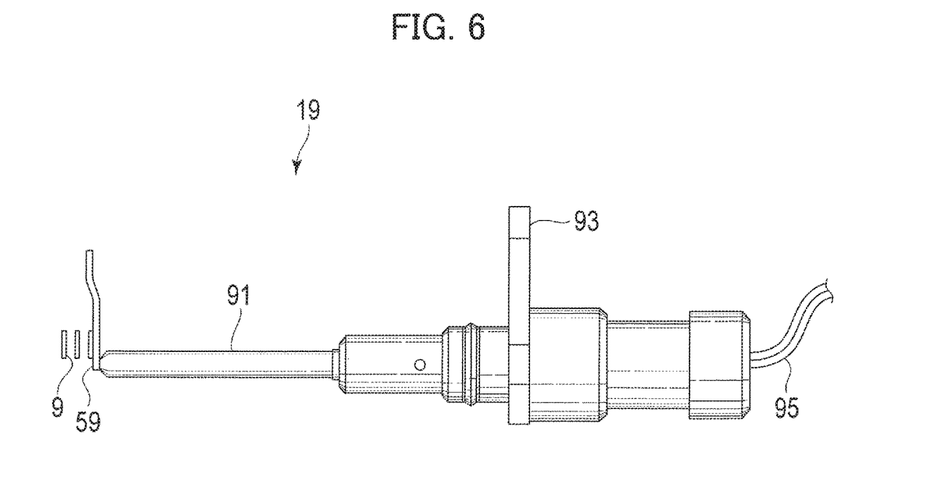
FIG. 6 is an elevational view of a switch and a pressure plate for sensing connection/disconnection of the clutch in accordance with an example.

The differential device may be further comprised of a device for detecting whether the clutch 5 is connected or not. An electrical switch 19 for example, as shown in FIG. 6, may be used. The switch 19 is, for example, comprised of an extensible rod 91, a retainer 93 for fixing with the carrier, and a cable 95 led out to the exterior. The head of the rod 91 is for example in contact with the pressure plate 59 and the switch 19 is thereby switched ON/OFF in accordance with the position of the pressure plate 59, thereby detecting whether the clutch 5 is connected or not via the cable 95. This device directly detects connection/disconnection of the clutch 5 on the basis of the position of the pressure plate 59 and can therefore detect states of the clutch 5 more reliably as compared with detection by determining whether the electric power is applied to the actuator.

To directly detect whether the clutch 5 is connected or not allows operation of the differential device with less electric power consumption. As being understood from FIG. 7, the thrust force by the actuator 7 steadily exceeds the drag force by the springs 9, 11 but this thrust force becomes excessive after finishing connection (or disconnection) of the clutch 5. Then after detecting the connection (or the disconnection), the device may be so operated as to lower the input electric power, thereby suppressing energy consumption.

Although the invention has been described above by reference to certain exemplary embodiments, the invention is not limited to the exemplary embodiments described above. Modifications and variations of the embodiments described above will occur to those skilled in the art, in light of the above teachings.

The invention claimed is:

1. A differential device, comprising:
   an outer case configured to receive torque and that is rotatable about an axis;
   a differential gear set housed in the outer case and combinable with first and second axles, the differential gear set being so geared as to allow differential motion between the first and the second axles;
   a clutch including an inner case supporting the differential gear set, and a clutch ring drivingly engaged with the outer case to transmit the torque from the outer case and axially movable to disconnectably connect with the inner case, the clutch ring having an end section led out of the outer case;
   a first spring creating a repulsive force in a direction to make the clutch ring disconnect from the inner case;
   a second spring creating a repulsive force in a direction to make the clutch ring connect with the inner case; and
   an actuator including a plunger so disposed as to exert a thrust force axially on the end section of the clutch ring, and a solenoid driving the plunger, in response to input of an electric power, in a direction to make the clutch ring disconnect from or connect with the inner case.

2. The differential device of claim 1, wherein the solenoid comprises a core at least partly made of a material having magnetism so as to conduct a magnetic flux generated in accordance with the electric power and that encloses the solenoid, and the second spring is repulsively interposed between the core and the plunger.

3. The differential device of claim 1, wherein the plunger, the core and the second spring are so dimensioned that the plunger abuts the core to rest.

4. The differential device of claim 2, wherein the core comprises a gap, and the plunger is disposed adjacent to the gap and movable from a position to cover the gap in part and a position to cover the gap totally.

5. The differential device of claim 2, wherein the second spring is repulsively interposed between the plunger and an outer face of the core.

6. The differential device of claim 1, wherein the clutch ring further comprises a pressure plate capable of being in contact with the plunger.

7. The differential device of claim 6, wherein the first spring is repulsively interposed between the pressure plate and the outer case.

8. The differential device of claim 6, wherein the plunger or the second spring is so dimensioned as to prevent the plunger from being in contact with the pressure plate when the clutch ring is connected with the inner case.

9. The differential device of claim 1, wherein the second spring is repulsively loaded in the plunger.

\* \* \* \* \*

UNITED STATES PATENT AND TRADEMARK OFFICE
CERTIFICATE OF CORRECTION

PATENT NO. : 10,308,113 B2
APPLICATION NO. : 15/641530
DATED : June 4, 2019
INVENTOR(S) : Hideyuki Inose, Yasuo Yamanaka and Yasushi Nagamori It is certified that error appears in the above-identified patent and that said Letters Patent is hereby corrected as shown below:

In the Claims

Column 8, in Line 36, Claim 3 replace "device of claim 1," with -- device of claim 2, --.

Signed and Sealed this
Sixteenth Day of July, 2019

Andrei Iancu
*Director of the United States Patent and Trademark Office*